United States Patent [19]
Takeuchi et al.

[11] Patent Number: 5,355,392
[45] Date of Patent: Oct. 11, 1994

[54] DIGITAL DATA DETECTOR FOR REDUCING ERRORS DUE TO FREQUENCY VARIATIONS

[75] Inventors: Hitoshi Takeuchi, Kitakatsuragi; Chiaki Yamawaki, Habikino, both of Japan

[73] Assignee: Sharp Kabushiki Kaisha, Osaka, Japan

[21] Appl. No.: 986,490

[22] Filed: Dec. 7, 1992

[30] Foreign Application Priority Data

Dec. 13, 1991 [JP] Japan .................................. 3-330427

[51] Int. Cl.$^5$ ............................................. H03M 3/00
[52] U.S. Cl. ...................................... 375/94; 375/118
[58] Field of Search ................. 375/94, 95, 110, 118; 329/304, 345

[56] References Cited

U.S. PATENT DOCUMENTS

| | | | |
|---|---|---|---|
| 4,845,574 | 7/1989 | Ii et al. | 360/51 |
| 5,231,650 | 7/1993 | Satomura | 375/95 |

FOREIGN PATENT DOCUMENTS

| | | |
|---|---|---|
| 0241974 | 10/1987 | European Pat. Off. |
| 0300826 | 1/1989 | European Pat. Off. |

OTHER PUBLICATIONS

"A Data Detection Method for a Stationary Head Digital Tape Recorder", Technical Rpt. Information and Communication Engineers of Japan, Jan. 26, 1983.

*Primary Examiner*—Stephen Chin
*Assistant Examiner*—Timothy S. May
*Attorney, Agent, or Firm*—Nixon & Vanderhye

[57] ABSTRACT

A digital receive signal is sampled by an A/D converter, and the position of a point at which the receive signal crosses a reference level is obtained in response to sampling data by an exclusive OR gate. A phase interval between the present sampling point and the point at which the receive signal crosses the reference level is obtained by an arithmetic circuit, and the phase of the present sampling point is obtained in accordance with the position of the crossing point, the phase interval P between the present sampling point and the crossing point obtained by arithmetic circuit, the phase of a preceding sampling point obtained by an I-bit parallel delay circuit, and the phase of a sampling point which is two points preceding to the present sampling point and obtained by an I-bit j-stage parallel delay circuit. A data detection clock signal and digital data are detected in accordance with the computed phase of each sampling point, an MSB of sampling data, and the phase interval between the present sampling point and the point at which the receive signal crosses the reference level.

7 Claims, 4 Drawing Sheets

FIG. 4

| MARK | BACKGROUND ART METHOD | PRESENT INVENTION |
|---|---|---|
| $R_{i+1}$ | (i+1)TH SAMPLING POINT | ← |
| $S_{i+1}$ | SAMPLING DATA AT (i+1)TH SAMPLING POINT $R_{i+1}$ | ← |
| P | PHASE SPACE BETWEEN A CERTAIN SAMPLING POINT AND A POINT AT WHICH RECEIVE SIGNAL CROSSES REFERENCE LEVEL | ← |
| $P_{i+1}'$ | PREDICTED VALUE OF PHASE AT (i+1)TH SAMPLING POINT $R_{i+1}$ | ← |
| $P_{di+1}$ | | PREDICTED VALUE OF PHASE SPACE BETWEEN (i+1)TH SAMPLING POINT $R_{i+1}$ AND i-TH SAMPLING POINT R |
| $P_{i+1}$ | PHASE AT (i+1)TH SAMPLING POINT $R_{i+1}$ | ← |

DIGITAL DATA DETECTOR FOR REDUCING ERRORS DUE TO FREQUENCY VARIATIONS

BACKGROUND OF THE INVENTION

1. Field of the Invention

The present invention relates generally to digital data detectors and, more particularly, to a digital data detector for detecting a data detection clock signal and digital data from a digital receive signal in a digital data transmission system.

2. Description of the Background Art

Conventionally, various methods for detecting digital data from a digital receive signal have been proposed. One example will be described in the following. That is, a digital receive signal is sampled at a frequency of m times (m>1) a channel bit rate. Then, from sampling data $S_{i+1}$ (hereinafter referred to as present data) of a sampling point $R_{i+1}$ at which a phase is calculated at present (hereinafter referred to as the present sampling point) and sampling data $S_i$ (hereinafter referred to as preceding data) of a preceding sampling point $R_i$ of the sampling point $R_{i+1}$ (hereinafter referred to as the preceding sampling point), an interval P between a point at which the receive signal crosses a zero level (hereinafter referred to as a zero cross point) and the presence sampling point $R_{i+1}$ is obtained by the following expression (1).

$$P = |S_{i+1}|/(|S_{i+1}| + |S_i|) \times (N/2) \quad (1)$$

where N is the value of a phase representing a channel bit interval. A predicted value $P_{i+1}'$ of the phase of the present sampling point $R_{i+1}$ (hereinafter referred to as the present phase predicted value) which is obtained from the value P and from a phase $P_i$ (hereinafter referred to as the preceding phase) of the preceding sampling point $R_i$ and a phase $P_{i-2}$ of a sampling point $R_{i-2}$ which is two sampling points before the sampling point $R_{i+2}$, is calculated by the following expression (2).

$$P_{i+1}' = \{(P_i - P_{i-2}) \times L + P_i + (N/2)\} \bmod N \ (L \text{ is a constant: } 0 < L < 1) \quad (2)$$

By use of this phase predicted value $P_{i+1}'$, a phase $P_{i+1}$ (hereinafter referred to as the present phase) of the present sampling point $R_{i+1}$ is obtained. When there is a zero cross point between the present sampling point $R_{i+1}$ and the preceding sampling point $R_i$, the above $P_{i+1}$ is obtained by the following expression (3).

$$P_{i+1} = \{(P - P_{i+1}') \times K + P_{i+1}'\} \bmod N \ (K \text{ is a constant: } 0 < K < 1) \quad (3)$$

On the other hand, when there is no zero cross point between the present sampling point $R_{i+1}$ and the preceding sampling point $R_i$, the above $P_{i+1}$ is obtained by the following expression (4).

$$P_{i+1} = P_{i+1}' \quad (4)$$

A data detection clock signal and digital data are detected on the basis of the result of comparison between P, $P_i$ and $P_{i+1}$ obtained by the above expressions (1) to (4) and the following clock signal extracting conditions and data determining conditions. This is disclosed in Japanese Patent Laying-Open No. 01-025357.

$P_i > P_{i+1}$, $P_i \geq N/2$, and $P_{i+1} \geq N/2$: There is a clock signal. (5)

$P_i > P_{i+1}$, $P_i < N/2$, and $P_{i+1} < N/2$: There is a clock signal. (6)

$P_i < P_{i+1}$, $P_i < N/2$, and $P_{i+1} \geq N/2$: There is a clock signal. (7)

When $P > P_{i+1} - N/2$, digital data is opposite to an MSB (Most Significant Bit) of $S_i$; otherwise, the digital data is the MSB of $S_i$ (8)

FIG. 3 is a diagram for use in explaining problems which occur when data is transmitted by using a conventional method. Now assume that when data shown in FIG. 3 (a) is transmitted via a certain transmission path, distortion occurs due to characteristics of the transmission path and that a receive signal shown in FIG. 3 (b) is received on a receiver side. (With respect to transmission data in this case, a minimum inversion spacing T min is equal to a detection window width Tw.) In a case the result obtained by sampling this receive signal at a double frequency of the channel bit rate is input to a data detector by a conventional method. Here, a channel bit interval is equally divided into 64 portions to represent a phase (i.e., N=64) and both of the foregoing coefficients K and L are 0.25.

First, a phase interval P between the present sampling point $R_{i+1}$ and the zero cross point is obtained on the basis of the foregoing expression (1). The expression (1) is effective only when a zero cross point exists between the present sampling point $R_{i+1}$ and the preceding sampling point $R_i$. Referring to FIG. 3, sampling points $R_1$ and $R_8$ meet this condition, and the phase interval P at this time is as shown in FIG. 3 (d) below.

Sampling point $R_1$:
$P = |S_1|/(|S_1| + |S_0|) \times (N/2) = 30/(30+23) \times 32 = 18$ Sampling point $R_8$:
$P = |S_8|/(|S_8| + |S_7|) \times (N/2) = 5/(5+47) \times 32 = 3$ Focusing on the sampling point $R_1$, a predicted value $P_1'$ of the present phase is as follows in accordance with the foregoing expression (2).

$P_i' = (P_0 - P_{-2}) \times L + \{(P_0 + N/2) \bmod N\} = (23-23) \times 0.25 + (23+32) \bmod 64) = 55$ (X mod Y means a remainder of X/Y.)

By use of this result and the foregoing computation result of P, the present phase $P_1$ is obtained by the expression (3).

$P_i = \{(P - P_1') \times K + P_1'\} \bmod N = \{(18-55) \times 0.25 + 55\} \bmod 64 = 61$ (The value of the phase is 0 to N−1; and when the phase value exceeds N/2, computation is carried out by using a value obtained by subtracting N from the resultant value.) In the case with a sampling point $R_2$, since there is no zero cross point between the present sampling point $R_2$ and the preceding sampling point $R_1$, a predicted value $P_2'$ of the present phase is the present phase $P_2$.

$$P_2 = P_2' = (P_1 - P_{i-1}) \times L + (P_1 + N/2) = (61-55) \times 0.25 + (61+32) = 30$$

Similarly, if P, $P_{i+1}'$ and $P_{i+1}$ are obtained with respect to sampling points $R_3$-$R_9$, results are as shown in FIG. 3 (d)-(f). If these results are compared with the above-described clock signal extracting conditions and data determining conditions (the expressions (5)-(8)), a data detection clock signal and digital data are as shown in FIG. 3 (g) and (h). These results do not match transmission data and are hence erroneous data. As can be seen from FIG. 3 (b), the receive signal has a frequency variation, and the above data error is due to this frequency variation.

As described above, in the conventional method, when there is a frequency variation in digital receive data as in a system for recording and reproducing digital data on a magnetic tape, for example, there is the problem that a data error is liable to occur, resulting in a degradation in reliability of the system. This is because particularly when a zero cross point has not been detected over a long period of time upon obtaining a predicted value of a phase, phase information in the past has not been sufficiently reflected on the predicted value of the phase. In FIG. 3 (b), for example, since the phase is corrected with sampling data at the sampling point $R_1$, the phase interval between the sampling points $R_1$ and $R_0$ is 38, which is broader than the case where there is no frequency variation (N/2=32 when there is no frequency variation). However, the phase interval between sampling points $R_3$ and $R_4$ is 32, and hence, the result which is corrected at the sampling point $R_1$ is not reflected.

SUMMARY OF THE INVENTION

A principal object of the present invention is therefore to provide a digital data detector in which data errors due to frequency variations such as wow and flutter are reduced as compared to a digital data detector of background art.

The present invention is directed to a digital data detector including a sampling data detecting circuit, a phase interval computing circuit, a reference level crossing detecting circuit, a predicted phase interval value computing circuit, a phase computing circuit, a data detection clock signal detecting circuit, and a data detecting circuit. The sampling data detecting circuit samples a digital receive signal at a definite frequency; the phase interval computing circuit computes a phase interval P between a present sampling point $R_{i+1}$ and a point crossing over a reference level in accordance with detected sampling data; and the reference level crossing detecting circuit detects the position of the point at which the digital receive signal crosses over the reference level.

The predicted phase interval value computing circuit computes a predicted value $Pd_{i+1}$ of a phase interval between the present sampling point $R_{i+1}$ and its preceding sampling point $R_i$ in accordance with a phase $P_i$ of the preceding sampling point $R_i$ of the present sampling point $R_{i+1}$, a phase $P_{i-j}$ (j is a natural number) of a sampling point $R_{i-j}$ which is at least two points preceding to the present sampling point $R_{i+1}$, and the position of a point at which the digital receive signal crosses over the reference level. The phase computing circuit computes the present phase $P_{i+1}$ in accordance with its preceding phase $P_i$, a phase interval P, a predicted value $Pd_{i+1}$ of a phase interval between the present sampling point $R_{i+1}$ and its preceding sampling point, and the position of a point at which the digital receive signal crosses over the reference level.

The data detection clock signal detecting circuit detects a data detection clock signal which is synchronized with a digital receive signal in accordance with the computed phase of each sampling point. The data detecting circuit detects digital data from a digital receive signal in accordance with the phase interval P between the point at which the digital receive signal crosses over the reference level and the present sampling point $R_{i+1}$, the present phase $P_{i+1}$, and detected sampling data.

Therefore, in accordance with the present invention, even if the frequency of a digital receive signal makes a large variation, the phase of each sampling point is accurately computed in accordance with its frequency variation. This makes it possible to accurately detect a clock signal being in synchronization with the digital receive signal and thereby accurately detect digital data from the digital receive signal.

In a more preferred embodiment of the present invention, the digital data detector includes as a phase interval computing circuit a sampling data delay circuit for delaying detected sampling data by a delay amount corresponding to a sampling period, and an arithmetic circuit for receiving sampling data after delay as the present sampling data and sampling data before delay as preceding sampling data to calculate a phase interval P.

Further, the predicted phase interval value computing circuit includes a phase delay circuit for sequentially delaying outputs of an addition circuit which outputs the present phase $P_{i+1}$, and outputting signals indicating a phase $P_i$ of a preceding sampling point $R_i$ of the present sampling point $R_{i+1}$ and a phase $P_{i-j}$ of a sampling point $R_{i-j}$ which is at least two points preceding to the present sampling point $R_{i+1}$, and a circuit responsive to an output of the phase delay circuit and a detection output of the reference level crossing detecting circuit for computing a predicted value of the present phase and applying the computed predicted value to the addition circuit and to the phase computing circuit.

Further, the phase computing circuit includes a subtraction circuit for subtracting the present phase predicted value $P'_{i+1}$ from the phase interval P, a coefficient multiplication circuit for multiplying an output of the subtraction circuit by a predetermined coefficient, and a circuit responsive to the detection output of the reference level crossing detecting circuit for adding a predicted value of the present phase to an output of the coefficient multiplication circuit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing a list of marks used in the background art method and in the present invention.

DESCRIPTION OF THE PREFERRED EMBODIMENTS

Figure 1:
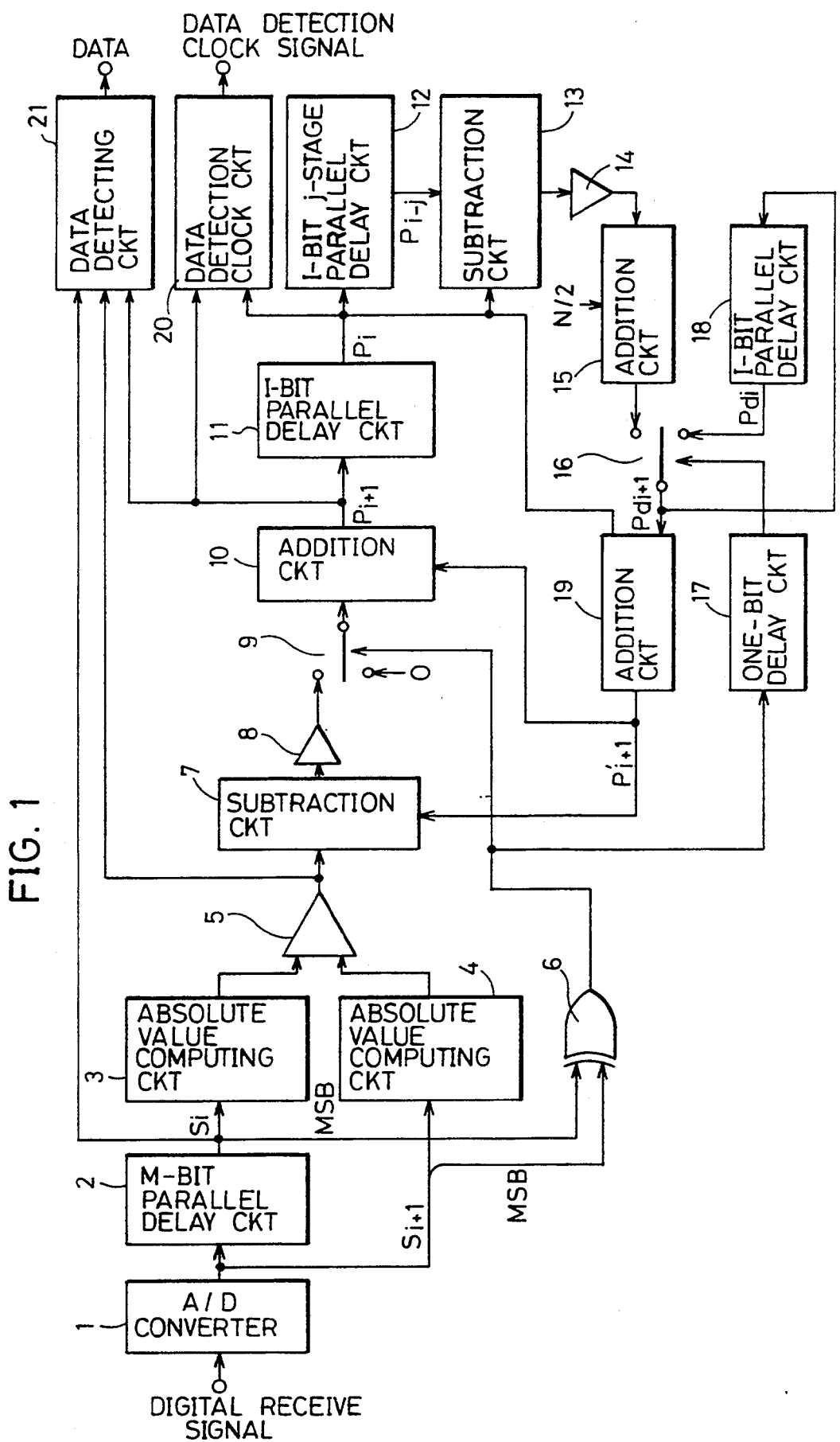
FIG. 1 is a block diagram showing one embodiment of the present invention.

FIG. 1 is a detailed block diagram of one embodiment of the present invention. In the embodiment shown in FIG. 1, a description will now be made on the case where digital data is detected from a digital receive signal according to an NRZ type modulation system with a minimum inversion space (Tmin)=0.8T and a maximum inversion space (Tmax)=3.2T. An A/D converter 1 is supplied with a digital receive signal. This digital receive signal is sampled at a frequency m times a channel bit rate by A/D converter 1, and the sampled signal is then converted into digital data of M bits. This conversion represents the polarity of a reproduced signal by using, for example, two's complement "0" and "1" of MSB (Most Significant Bit).

An output of A/D converter 1 is first input to an M-bit parallel delay circuit 2. M-bit parallel delay circuit 2 has a delay amount corresponding to a sampling period, whose output is applied as preceding sampling data $S_i$ to an absolute value computing circuit 3. An output of A/D converter 1 is further applied as present sampling data $S_{i+1}$ to an absolute value computing circuit 4. Respective outputs of absolute value computing circuits 3 and 4 are applied as absolute values $|S_i|$ and $|S_{i+1}|$ of preceding and present sampling data to an arithmetic circuit 5. Arithmetic circuit 5 obtains a phase interval P between a present sampling point $R_{i+1}$ and a zero cross point in accordance with the aforementioned expression (1) by using the absolute values $|S_i|$ and $|S_{i+1}|$ of the preceding and present sampling data. In order to determine whether there is a zero cross point between the present sampling point $R_{i+1}$ and the preceding sampling point $R_i$, the MSB of outputs of A/D converter 1 and M-bit parallel delay circuit 2 is input to an exclusive OR gate (hereinafter referred to as the EXOR gate) 6. EXOR gate 6 outputs "1" when respective logics of two inputs are different from each other. Since sampling data represents a polarity by "1" or "0" of the MSB as described above, a zero cross point exists between the present sampling point and the preceding sampling point when an output of EXOR gate 6 is "1".

An output of arithmetic circuit 5 is input to a subtraction circuit 7. An output of an addition circuit 19 which is a predicted value $P'_{i+1}$ of the present phase is input to the other input of substraction circuit 7 as will be described later. Subtraction circuit 7 outputs the result obtained by subtracting the output of addition circuit 19 from the output of arithmetic circuit 5. An output of subtraction circuit 7 is input to a coefficient circuit 8. Coefficient circuit 8 multiplies the output of subtraction circuit 7 by a certain coefficient K (0<K<1) and outputs the result of the multiplication. Respective outputs of coefficient circuit 8 and EXOR gate 6 are input to a selecting circuit 9. As has been described previously, since the phase interval P between the present sampling point $R_{i+1}$ and the zero cross point is effective only when the zero cross point exists between the present sampling point $R_{i+1}$ and the preceding sampling point $R_i$, selecting circuit 9 selects the output of coefficient circuit 8 when the output of EXOR gate 6 is "1", i.e., the zero cross point exists between the present sampling point $R_{i+1}$ and the preceding sampling point $R_i$, while it outputs "0" when the output of EXOR gate 6 is "0", i.e., there is no zero cross point between the present sampling point $R_{i+1}$ and the preceding sampling point $R_i$. The output of selecting circuit 9 is input to an addition circuit 10. The output of addition circuit 19 which is the predicted value $P'_{i+1}$ of the present phase is input to the other input of addition circuit 10 as will be described later. Addition circuit 10 outputs the sum of these two values, i.e., the present phase $P_{i+1}$.

The output of addition circuit 10 which represents the present phase $P_{i+1}$ is input to an I-bit parallel delay circuit 11. The I-bit parallel delay circuit 11 has a delay amount corresponding to a sampling period, whose output is input as a preceding phase $P_i$ to an I-bit j-stage parallel delay circuit 12 and a subtraction circuit 13. I-bit j-stage parallel delay circuit 12 has a delay amount of j times (j is a natural number) of a sampling period, whose output is input as a phase $P_{i-j}$ preceding by j+1 into subtraction circuit 13. Subtraction circuit 13 subtracts the output of I-bit j-stage parallel delay circuit 12 from the output of I-bit parallel delay circuit 11, and outputs the result obtained by subtracting a phase interval between ideal sampling points from the result of the subtraction of the output of I-bit j-stage parallel delay circuit 12. The phase interval between ideal sampling points is determined by the number j of stages of I-bit j-stage parallel delay circuit 12. When j is odd, the phase interval is N/2, while when j is even, the phase interval is zero. The output of subtraction circuit 13 is input to a coefficient circuit 14. Coefficient circuit 14 outputs the result obtained by multiplying the output of subtraction circuit 13 by a certain coefficient L (0<L<1).

The output of coefficient circuit 14 is applied to an addition circuit 15, so that a phase value N/2 representing a sampling period is added to the applied output. An output of addition circuit 15 is input to a selecting circuit 16. Selecting circuit 16 is also provided with respective outputs of a one-bit delay circuit 17 and an I-bit parallel delay circuit 18. One-bit delay circuit 17 is provided with the output of EXOR gate 6. This delay circuit 17 delays the output of EXOR gate 6 by a time corresponding to the sampling period and outputs the same. That is, the output of one-bit delay circuit 17 indicates whether there is a zero cross point between the preceding sampling point $R_i$ and a sampling point $R_{i-1}$ which is two points preceding to the present sampling point.

I-bit parallel delay circuit 18 is provided with an output of selecting circuit 16. I-bit parallel delay circuit 18 delays the output of selecting circuit 16 by a time corresponding to the sampling period and outputs the same. Selecting circuit 16 selects an output of addition circuit 15 when the output of one-bit delay circuit 17 is "1", i.e., a zero cross point exists between the preceding sampling point $R_i$ and the sampling point $R_{i-1}$ which is two points preceding to the present sampling point. When the output of one-bit delay circuit 17 is "0", i.e., there is no zero cross point between the preceding sampling point $R_i$ and the sampling point $R_{i-1}$ two points before the present sampling point, selecting circuit 16 selects the output of I-bit parallel delay circuit 18 and outputs the selected output as a predicted value $Pd_{i+1}$ of the phase interval between the present sampling point $R_{i+1}$ and the preceding sampling point $R_i$. Accordingly, the output of I-bit parallel delay circuit 18 is a predicted value $Pd_i$ of the phase interval between the preceding sampling point $R_i$ and the further preceding sampling point $R_{i-1}$. The output of selecting circuit 16 is input to addition circuit 19. Addition circuit 19 has the other input provided with an output of I-bit parallel delay circuit 11, i.e., a preceding phase $P_i$. Addition circuit 19 calculates the sum of these two values and outputs the result as a predicted value $P'_{i+1}$ of the present phase.

The foregoing phase calculation is not merely an arithmetic operation but must be carried out in the range of 0 to N−1 similarly to, for example, a calculation of angles made in the range of 0° to 360°.

A data detection clock signal and digital data are detected on the basis of the phase information thus obtained. With reference to FIG. 1, a data detection clock signal detecting circuit 20 is provided with an output of addition circuit 10 which represents the present phase $P_{i+1}$ and with an output of I-bit parallel delay circuit 11 which represents the preceding phase. Data detection clock signal detecting circuit 20 compares the above-described clock signal extracting conditions and two inputs. Then, if the conditions are satisfied, i.e., digital data at that time is effective, detecting circuit 20 outputs "1". On the other hand, if the conditions are not satisfied, i.e., digital data at that time is ineffective, detecting circuit 20 outputs "0". A subsequent circuit, e.g., a demodulation circuit or the like processes only effective digital data in response to an output of data detection clock signal detecting circuit 20, i.e., a data detection clock signal.

Further, a data detecting circuit 21 is provided with an MSB of an output of M-bit parallel delay circuit 2 which represents the polarity of the preceding sampling data, an output of arithmetic circuit 5 which represents the phase interval between the present sampling point $R_{i+1}$ and the zero cross point, and an output of I-bit parallel delay circuit 11 which represents the preceding phase. Data detecting circuit 21 compares the above-described data determining conditions and those inputs, and detects digital data in accordance with the respective conditions.

The present invention can be realized by the foregoing method. The foregoing process will be organized as follows.

First, a determination is made as to whether a zero cross point exists immediately before the present sampling point $R_{i+1}$, i.e., between the present sampling point $R_{i+1}$ and the preceding sampling point $R_i$. If there is a zero cross point, a phase interval P between the zero cross point and the present sampling point $R_{i+1}$ is first obtained by the following expression (9) by employing present sampling data $S_{i+1}$ and its preceding sampling data $S_i$.

$$P = |S_{i+1}|/(|S_{i+1}|+|S_i|) \times (N/2) \qquad (9)$$

Next, a determination is made as to whether there is any zero cross point immediately before a preceding sampling point $R_i$, i.e., between the preceding sampling point $R_i$ and a sampling point $R_{i-1}$ which is two points before the present sampling point. If the zero cross point exists therebetween, a predicted value $Pd_{i+1}$ of the phase interval between the present sampling point $R_{i+1}$ and the preceding sampling point $R_i$ is obtained by the following expression (10) by employing a preceding phase $P_i$ and a phase $P_{i-j}$ of a sampling point which is two or more points before the present sampling point.

$$Pd_{i+1} = \{(P_i - P_{i-j} - (N/2 \times j)) \bmod N) \times L + N/2\} \bmod N \text{ (L is a constant in the range of } 0<L<1.) \qquad (10)$$

If the there is no zero cross point, the predicted value $Pd_{i+1}$ of the phase interval between the present sampling point $R_{i+1}$ and the preceding sampling point $R_i$ is set to a predicted value $Pd_i$ of the phase interval between the preceding sampling point $R_i$ and the further preceding sampling point $R_{i-1}$ as shown in the following expression (11).

$$Pd_{i+1} = Pd_i \qquad (11)$$

A predicted value $P_{i+1}'$ of the present phase is obtained by the following expression (12) by employing the predicted value $Pd_{i+1}$ of the phase interval thus obtained and the preceding phase $P_i$.

$$P'_{i+1} = (P_i + Pd_{i+1}) \bmod N \qquad (12)$$

By use of the present phase predicted value $P'_{i+1}$ thus obtained and the phase interval P between the aforementioned zero cross point and the present sampling point $R_{i+1}$, the present phase $P_{i+1}$ is obtained by the following expression (13).

$$P_{i+1} = \{(P - P'_{i+1}) \times K + P'_{i+1}\} \bmod N \text{ (K is a constant in the range of } 0<K<1.) \qquad (13)$$

If there is no zero cross point immediately before the present sampling point $R_{i+1}$, the present phase predicted value $P'_{i+1}$ is set intactly to the present phase $P_{i+1}$.

A data detection clock signal and digital data are detected on the basis of the phase interval P between the zero cross point and the present sampling point $R_{i+1}$, the present phase $P_{i+1}$ and the preceding phase $P_i$ thus obtained, and the clock extracting conditions and the data determining conditions. The clock signal extracting conditions and the data determining conditions are shown as follows which are the same as in the background art method.

$P_i > P_{i+1}$, $P_i \geq N/2$, and $P_{i+1} \geq N/2$: There is a clock signal.

$P_i > P_{i+1}$, $P_i < N/2$, and $P_{i+1} < N/2$: There is a clock signal.

$P_i > P_{i+1}$, $P_i < N/2$, and $P_{i+1} \geq N/2$: There is a clock signal.

When $P > P_{i+1} - N/2$, digital data is opposite to the MSB of $S_i$, or otherwise, the MSB of $S_i$.

In the present invention, data errors due to frequency variations of a receive signal, which is the disadvantage of the background art method can be reduced by using the above-described method, and a higher reliability of the system can be retained.

Figure 3:
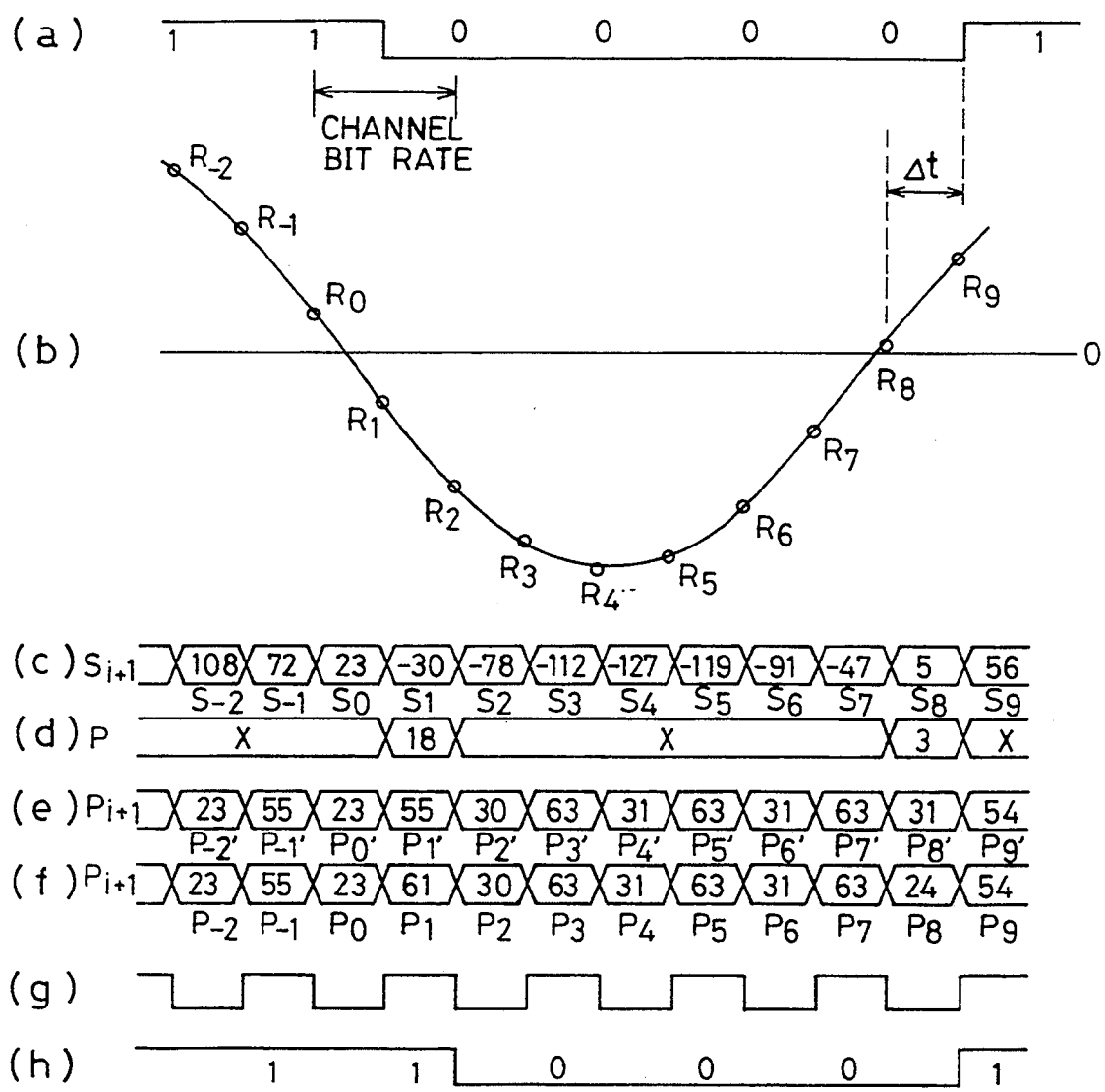
FIG. 3 is a diagram for use in explaining problems arising in the use of the background art method.

Like the case with the background art method, such a case is now considered that the receive signal shown in FIG. 3 (b) is sampled at a double channel bit rate and then input to the data detector of one embodiment of the present invention. First, a phase interval P between a zero cross point and the present sampling point is obtained in accordance with sampling data. Like the foregoing background art method, since this method is effective only with respect to sampling points $R_1$ and $R_8$, the phase interval P in each case is as follows.

Sampling point $R_1$:
$P = |S_1|/(|S_1|+|S_0|) \times N/2 = 30/(30+23) \times 32 - = 18$ Sampling point $R_8$:
$$P = |S_8|/(|S_8|+|S_7|) \times N/2 = 5/(5+47) \times 32 = 3$$

Next, a predicted value $Pd_{i+1}$ of the phase interval between the present sampling point $R_{i+1}$ and the preceding sampling point $R_i$ is obtained. In the case with a sampling point $R_1$, since there is no zero cross point between its preceding sampling point $R_0$ and a sampling point $R_{i-1}$ which is two points before the sampling point $R_1$, a predicted value $Pd_1$ of the phase interval is a predicted value $Pd_0 = 32$ of the phase interval between the preceding sampling point $R_0$ and the further preceding sampling point $R_{i-1}$ as shown in the above expression (11). If a predicted value $P_1'$ of the present phase is obtained by using this predicted value, the result is as follows by the above expression (12).

$$P_1' = P_o + Pd_1 = 24 + 32 = 56$$

If the present phase $P_1$ is obtained from the above result and from the previously obtained P, the result is as follows by the above expression (13).

$$P_1 = \{(P-P_1') \times K + P_1'\} \bmod N = \{(18-56) \times 0.25 + 56\} \bmod 64 = 62$$

Next, in the case with a sampling point $R_2$, since there is a zero cross point between its preceding sampling point $R_1$ and a sampling point $R_0$ which is two points before the sampling point $R_2$, a predicted value $Pd_2$ of the phase interval is as follows by the above expression (10) where $j=2$.

$$Pd_2 = \{(P_1-P_{-1}) \times L + N/2\} \bmod N = \{(62-56) \times 0.25 + 32\} \bmod 64 = 33$$

If a predicted value $P_2'$ of the present phase is obtained from the above result, the predicted value is as follows by the expression (12).

$$P_2' = (P_1 + Pd_2) \bmod N = (62+33) \bmod 64 = 31$$

Figure 2:
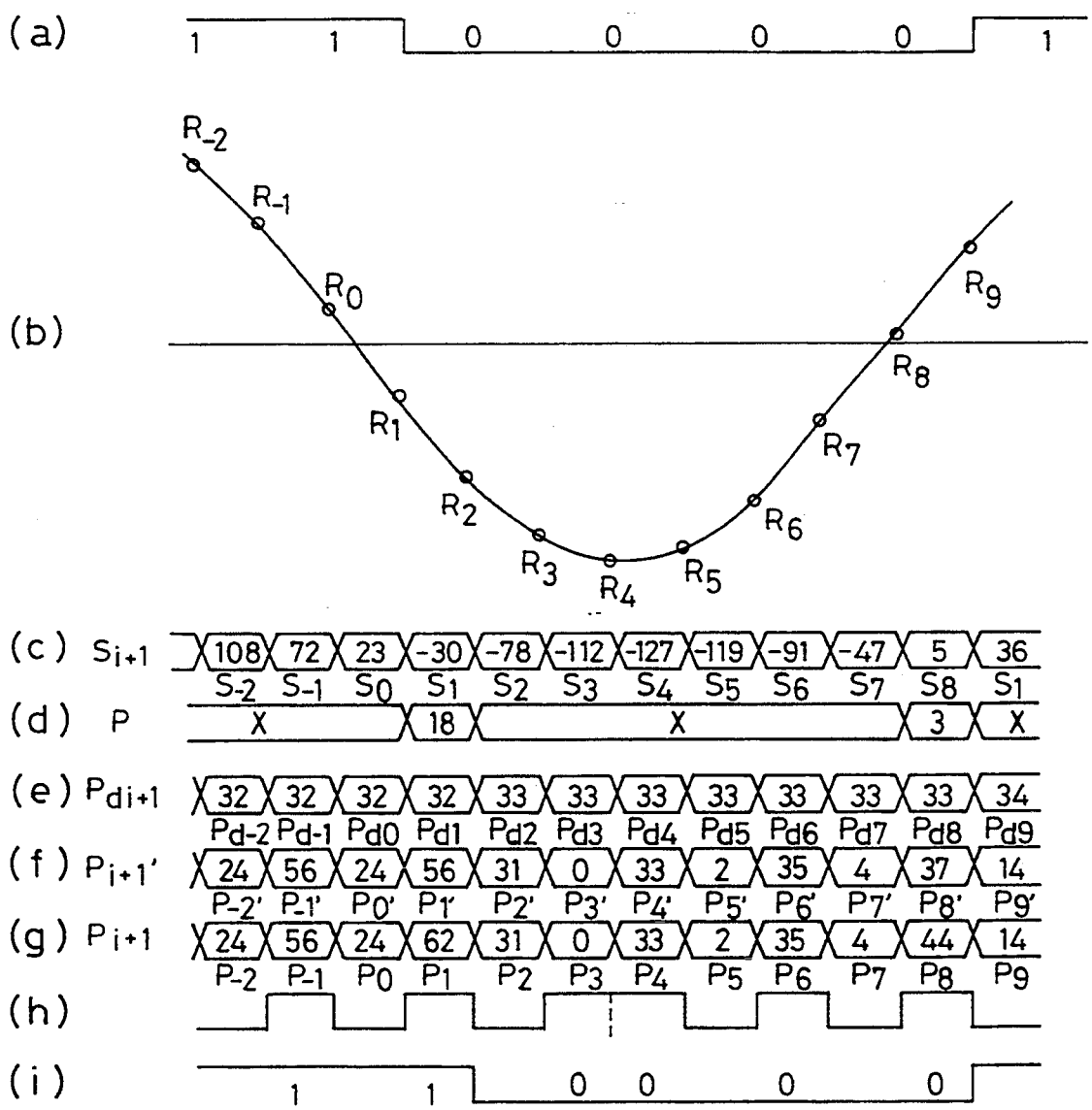
FIG. 2 is a diagram for use in comparing the result obtained by data detection according to one embodiment of the present invention with a background art method.

In this case, since there is no zero cross point between the present sampling point $R_2$ and the preceding sampling point $R_1$, the present phase $P_2$ is the predicted value $P_2'$ of the present phase. With respect also to sampling points $R_3$–$R_9$, if P, $Pd_{i+1}$, $P_{i+1}'$ and $P_{i+1}$ are obtained, the results are as shown in FIG. 2 $(d)$–$(g)$. If a data detection clock signal and digital data are generated on the basis of the clock signal extracting conditions and the data determining conditions by use of the results shown in FIG. 2 $(d)$–$(g)$, results are as shown in FIG. 2 $(h)$ and $(i)$. These results match transmitted data. Thus, the use of the method of the present invention makes it possible to detect accurate digital data from the receive signal having frequency variations and data errors which occur in the background art method.

While the foregoing description has been made on the case where an input is one channel, the present invention is also applicable to the case where an input is a multi-channel. In the case with Y channels, for example, a receive signal of each channel is sampled at a different timing, and each delay time of M-bit parallel delay circuit 2, I-bit parallel delay circuits 11 and 18, one-bit parallel delay circuit 17 and I-bit j-stage parallel delay circuit 12 is multiplied by Y.

While the foregoing embodiment has been directed to the NRZI type modulation system with $Tmin = 0.8T$ and $Tmax = 3.2T$, the present invention is not limited to this and also applicable to other modulation systems.

As has been described heretofore, in accordance with the present invention, it is possible to provide a digital data detector which can handle a digital receive signal having larger frequency variations than that of background art, by obtaining a predicted value of a phase interval between the present sampling point and its preceding sampling point from a phase of the preceding sampling point, a phase of a sampling point which is two or more points preceding to the present sampling point, and the position of a point at which the digital receive signal crosses a reference signal, and then obtaining a phase of the present sampling point from the obtained predicted value.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital data detector, comprising:

sampling data detecting means for sampling an input digital received signal at a frequency m times a channel bit rate ($m > 1$);

phase interval computing means connected to receive the sampling data detected by said sampling data detecting means for computing a phase interval P between a point, at which said digital received signal crosses a reference level, and a present sampling point $R_{i+1}$;

reference level crossing detecting means for detecting a position of the point at which said digital receive signal crosses the reference level;

phase interval predicted value computing means connected to receive a phase $P_i$ of a sampling point $R_i$ preceding said present sampling point $R_{i+1}$, a phase $P_{i-j}$ (j is a natural number) of a sampling point $R_{i-j}$ which is at least two points preceding said present sampling point $R_{i+1}$, and the position of the point at which said digital received signal crosses said reference level, detected by said reference level crossing detecting means, for computing a predicted value $Pd_{i+1}$ of a phase interval between said present sampling point $R_{i+1}$, and said preceding sampling point $R_i$;

phase computing means for computing a present phase $P_{i+1}$ based on said preceding phase $P_i$, said phase interval P between the point at which said digital receive signal crosses said reference level and said present sampling point $R_{i+1}$, computed by said phase interval computing means, said predicted value $Pd_{i+1}$ of the phase interval between said present sampling point $R_{i+1}$ and said preceding sampling point, computed by said phase interval predicted value computing means, and the position of the point at which said digital receive signal crosses said reference level, detected by said reference level crossing detecting means;

data detection clock signal detecting means connected to receive the phase of each sampling point computed by said phase computing means for detecting a data detection clock signal, which is synchronized with said digital received signal; and data detecting means for detecting digital data from said digital received signal in response to said phase interval P between the point at which said digital receive signal crosses said reference level and said present sampling point $R_{i+1}$, which is computed by said phase interval computing means, said present phase $P_{i+1}$, which is computed by said phase computing means, and sampling data detected by said sampling data detecting means.

2. The digital data detector as recited in claim 1, wherein said phase interval computing means includes sampling data delay means for delaying the sampling data detected by said sampling data detecting means by a delay amount corresponding to a sampling period, and operation means for computing said phase interval P in response to sampling data, which is delayed by said delay means, and to sampling data before delay, which is received as preceding sampling data.

3. The digital data detector as recited in claim 2, said phase interval computing means further comprising:

first absolute value computing means for computing an absolute value of the sampling data before being delayed by said delay means for applying the computed absolute value to said operation means; and second absolute value computing means for computing an absolute value of the sampling data after being delayed by said delay means for applying the computed absolute value to said operation means.

4. The digital data detector as recited in claim 1, wherein said phase interval predicted value computing means includes phase delay means for sequentially delaying said present phase $P_{i+1}$, which is computed by said phase computing means, by a delay amount corresponding to a sampling period, and outputting a signal representing the phase $P_i$ of the preceding sampling point $R_i$ and the phase $P_{i-j}$ of the sampling point $R_{i-j}$ which is at least two sampling points preceding said present sampling point $R_{i+1}$, and means responsive to an output of said phase delay means and a detection output from said reference level crossing detecting means for computing a predicted value of said present phase for applying the computed predicted value to said phase computing means.

5. The digital data detector as recited in claim 4, wherein said phase computing means includes subtraction means for subtracting a predicted value $P'_{i+1}$ of said present phase from said phase interval P computed by said phase interval computing means, coefficient multiplication means for multiplying an output of said subtraction means by a predetermined coefficient, and means operative in response to the detection of the position of the point at which said digital received signal crosses said reference level by said reference level crossing detecting means for adding said present phase predicted value to an output of said coefficient multiplication means.

6. A digital data detector as in claim 4, wherein said means for computing a predicted value includes:

means for producing a difference between outputs $P_i$ and $P_{i-j}$ from said phase delay means;

means for multiplying the output of the means for producing a difference by a constant L (L<1);

means for adding the output of the means for multiplying to a constant (N/2);

switching means having one input connected to the output of the means for adding and another input connected to the output of a delay means, said switching means being controlled for outputting one of the two inputs in response to the output of a further delay means for delaying a zero cross detection signal by 1 bit; and means for outputting the sum of the output of the switching means and the output Pi of the phase delay means, said sum being produced as a predicted value.

7. A digital data detector as in claim 6, wherein said input digital received signal is a multichannel input comprising Y channels and the received digital signals from each channel are sampled by said sampling data detecting means at times $\Delta t = \tau/Y$, wherein $\tau$ is the phase interval between sampling points and wherein the delay of said phase delay means, said delay means and said further delay means are multiplied by Y.

* * * * *